United States Patent [19]

Kontar et al.

[11] Patent Number: 4,557,697
[45] Date of Patent: Dec. 10, 1985

[54] METHOD OF DELIVERING TO OCEAN BOTTOM AND RAISING TO SURFACE OF STATION FOR DEEP WATER RESEARCHES AND DESIGN OF STATION DELIVERED USING SAID METHOD

[75] Inventors: Evgeny A. Kontar; Sergei L. Soloviev; Viktor P. Brovko, all of Moscow; Rudolf G. Glukhikh, Liepaya; Evgeny N. Khomyakov, Liepaya; Jury F. Pakhomov, Liepaya; Alexei M. Khmeljuk, Moscow; Vladimir I. Vyalykh, Moscow; Leonid G. Zansokhov, Moscow; Valentin P. Smertin, Moscow; Alexei I. Evseev, Moscow; Fyarit A. Sharipov, Liepaya, all of U.S.S.R.

[73] Assignee: Institut Okeanologii Imeni P.P. Shirshova, U.S.S.R.

[21] Appl. No.: 400,901

[22] Filed: Jul. 22, 1982

[51] Int. Cl.⁴ ............................ B63B 21/52
[52] U.S. Cl. ........................ 441/2; 441/28; 441/32; 114/326; 73/864.31
[58] Field of Search ............ 441/1, 2, 11, 12, 21, 441/28, 29, 32, 33; 114/317, 326, 331, 312, 244, 245; 73/864.31

[56] References Cited

U.S. PATENT DOCUMENTS

| | | | |
|---|---|---|---|
| 3,572,129 | 3/1971 | Walthier et al. | 73/864.31 |
| 3,602,959 | 9/1971 | Perez | 441/2 |
| 3,851,348 | 12/1974 | Gilbert et al. | 441/21 |
| 4,189,703 | 2/1980 | Bennett | 441/11 |
| 4,196,531 | 4/1980 | Balligand et al. | 73/864.31 |
| 4,300,254 | 11/1981 | Prior | 441/28 |

FOREIGN PATENT DOCUMENTS

| | | | |
|---|---|---|---|
| 2413490 | 11/1974 | Fed. Rep. of Germany | 441/1 |
| 2354920 | 1/1978 | France | 441/1 |
| 487803 | 10/1975 | U.S.S.R. | 441/1 |

Primary Examiner—Trygve M. Blix
Assistant Examiner—Stephen P. Avila
Attorney, Agent, or Firm—Steinberg & Raskin

[57] ABSTRACT

A method of delivering to the ocean bottom and raising to the surface of a station provided with instrument packages for deep-water researches is realized by way of free submergence of the station in a water mass under the action of negative buoyancy of a ballast weight, landing of the station to the bottom, dropping of the ballast weight upon completing the bottom researches, and free emergence of the station under the action of positive buoyancy of a float module. In the course of free submergence, the station is divided into a unit comprising the instrument packages and a unit comprising the ballast weight and the float module, the unit comprising the instrument packages is directed along a path differing from the path of the free-falling unit comprising the ballast weight, thus ensuring the landing of the instrument packages at a predetermined distance from the ballast weight. After the ballast weight has been dropped the instrument packages are lifted off the ocean bottom with the float module attaining a constant ascending speed. A station for deep-water researches comprises a float module and a ballast weight connected therewith by means of a flexible link, a flexible link release controlled through a hydroacoustic channel, as well as instrument packages. The instrument packages are interconnected by means of a cantilever rod mounted on the float module for a free upward movement, fastened thereto by an elastic rope and provided with a means to create hydrodynamic resistance to the movement of the cantilever rod during submergence of the station.

4 Claims, 12 Drawing Figures

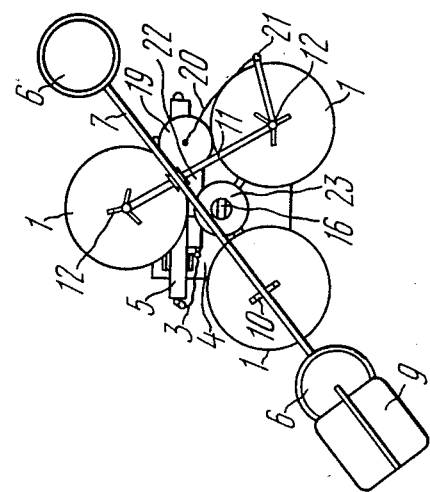
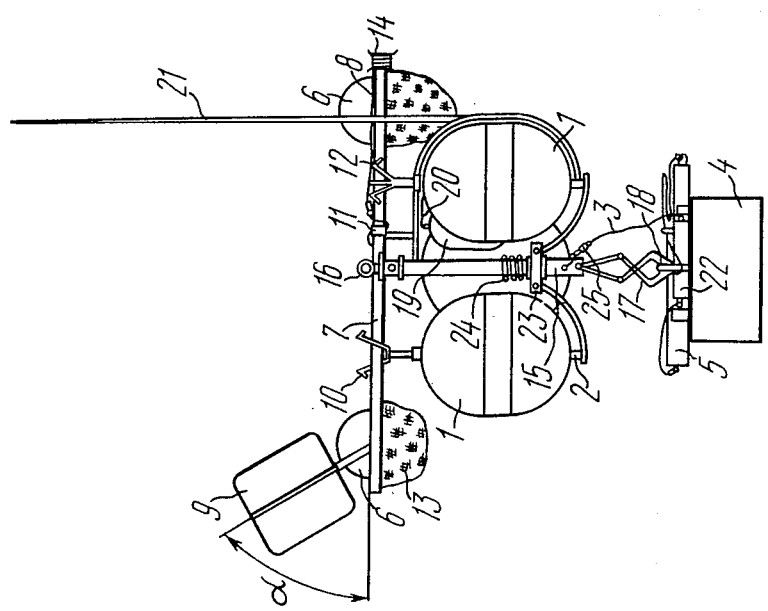

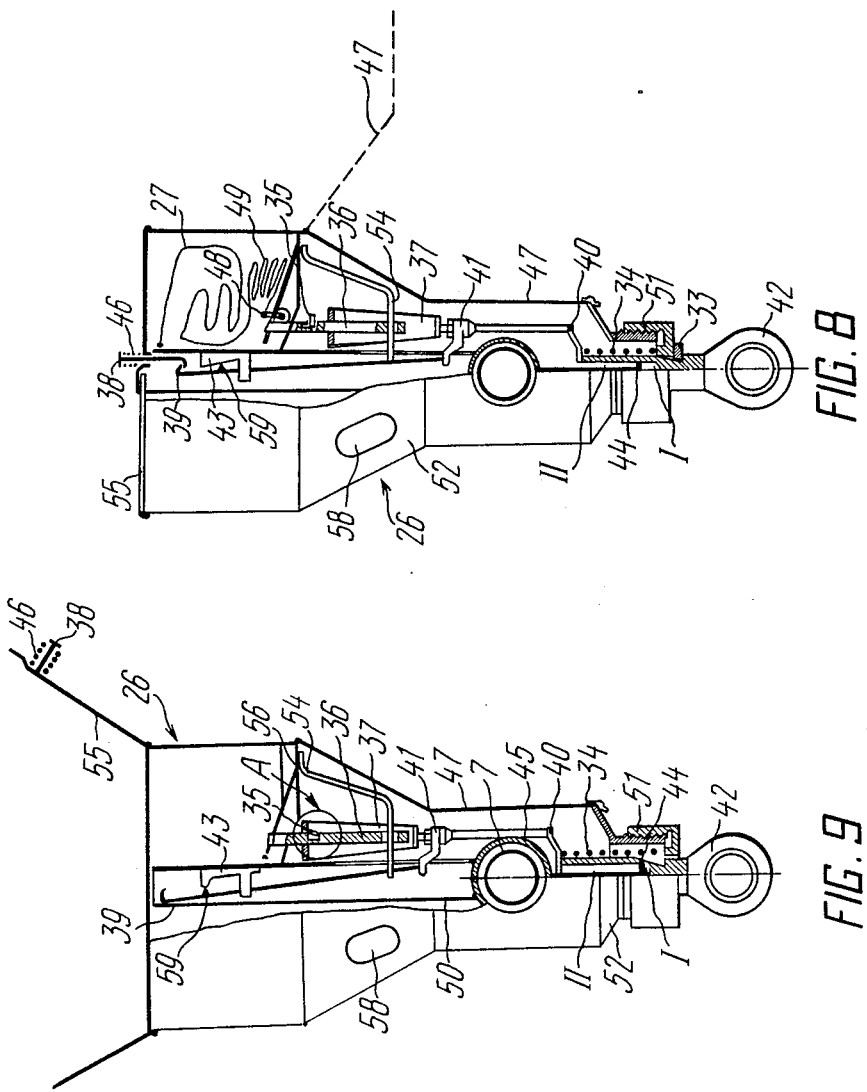

METHOD OF DELIVERING TO OCEAN BOTTOM AND RAISING TO SURFACE OF STATION FOR DEEP WATER RESEARCHES AND DESIGN OF STATION DELIVERED USING SAID METHOD

FIELD OF THE INVENTION

The invention relates to exploration of seas and oceans and more specifically is concerned with methods of delivering to the ocean bottom and raising to the surface of a station for deep-water researches and designs of the stations delivered using said methods.

Such stations are widely used to carry out oceanological, oceanographic, geological, geophysical, hydrophysical explorations and other research and industrial work in abyssal zones of the World Ocean.

BACKGROUND OF THE INVENTION

There are known methods of delivering to the ocean bottom and raising to the surface of stations for deep-water researches, comprising lowering a ballast weight or an anchor to the ocean bottom with the use of a rope. Attached to the upper portion of the rope is a surface or subsurface float, and suspended from the same rope are recording instruments accommodated in high-strength packages. As a rule, the instrument packages being mounted on the ocean bottom land simultaneously with the ballast weight at a speed of about 2 m/s, which inevitably results in a comparatively strong impact of the instrument packages against the ocean bottom often causing damage to the instruments. The preset program completed, the carrier craft searches the bottom station with the help of a radio beacon installed on the surface float or, if the subsurface float is employed, with the help of a sonar beacon secured to the rope in close proximity to the subsurface float, usually at a depth of 100 to 150 m. After detecting the subsurface float of the station, a command is supplied through a hydroacoustic channel to an underwater hydroacoustic rope release mechanism arranged at the ballast weight, a tool thereof severs the rope in the place where it is installed, and the float due to positive buoyancy emerges to the surface of the ocean to be retrieved by the carrier craft. In all cases of delivering the recording instruments to the ocean bottom considered herein, the use is made of a winch to pay out and reel in many kilometers of the rope (cf., e.g., Walden R. G. Oceanographic and Meteorological Buoys.—Underwater Science and Technology Journal, September, 1970).

Drawbacks of the foregoing methods of implanting and recovering deep-water stations are the low productivity and insufficient reliability in operation of tethered systems with too much time spent to pay out and reel in many kilometers of the rope which may break even due to inconsiderable excessive strain, fouling, kinks, etc., which is inconsistent with the research vessel's high daily at-sea cost. As the floats or carrier craft drift continuously bringing about a continuous displacement of the rope carrying the instruments in the water mass, the quality of recording various parameters is not high. Altogether the buoy bottom stations having surface or subsurface floats, which are lowered to the ocean bottom by means of a rope directly from a carrier craft, as far as their main service performances are concerned, are inferior to the self-contained free-falling devices.

There is also known a method of delivering to the ocean bottom and raising to the surface of deep-water research stations, which comprises free submergence of the station having instrument packages in the water mass under the action of negative buoyancy of a ballast weight, landing of the station to the bottom, dropping of the ballast weight upon performance of the bottom researches and free emergence of the station under the action of positive buoyancy of a float.

There is known the design of a station for deep-water researches delivered to the ocean bottom and recovered to the surface using the method described above. The station comprises a float module and a ballast weight connected therewith by a flexible link, a flexible link release controlled through a hydroacoustic channel, and instrument packages, in this particular case—a bottom sampler in combination with the ballast weight.

The float module is provided with a system to assist locating the surfaced station. To assist in locating the submerged station, it has a sonar beacon. After being launched from a carrier craft the known self-contained sampler freely submerges at a speed of about 2 m/s. When the sampler strikes the ocean bottom its working member takes a sample of sediments, drops the ballast weight and the sampler acted upon by positive buoyancy of the float module emerges at a speed of 1.4 to 1.6 m/s to the surface of the ocean to be detected and taken aboard (cf. e.g., U.S. Pat. No. 3,572,129, cl. 73-864.31, dated Mar. 23, 1971, a prototype of the present alleged invention).

However, the foregoing method and station delivered to the bottom and recovered to the surface of the ocean using said method are characterized by a low operating reliability and frequent damages to the instruments at impacts against the ocean bottom. A ten-twelve time decrease in a speed of free submergence to 0.2–0.15 m/s ensures a soft landing of the station, but in such a case a cycle of free submergence of the station to a depth of 5000 to 6000 m will take from 20 to 30 hours, which will result in failure to exactly position the station at the predetermined area of the ocean bottom due to drifting of the station under the action of deep currents. The use of a system of near-to-bottom braking of the instruments with the ballast weight going ahead is also not efficient enough, as it may impede a close contact between the instrument packages and the ocean bottom and not ensure their soft landing at a predetermined distance from the ballast weight, an impact of the instrument packages against the leading ballast weight being not excluded.

SUMMARY OF THE INVENTION

An object of the invention is to ensure a soft landing of the instrument packages to the ocean bottom.

Another object of the invention is to ensure a close contact of the instrument packages with the ocean bottom.

Still another object of the invention is to ensure landing of the station in a predetermined area of the ocean bottom.

A further object of the invention is to ensure landing of the instrument packages at a predetermined distance from a ballast weight.

One more object of the invention is to increase the reliability of the station operation.

These objects are accomplished in that in a method of delivering to the ocean bottom and raising to the surface of a station having instrument packages for deep-water researches by way of free submergence of the station in a water mass under the action of negative buoyancy of a ballast weight, landing of the station to the bottom, dropping of the ballast weight upon completing the bottom researches, and free emergence of the station under the action of positive buoyancy of a float module, according to the invention in the course of the free submergence the station is divided into a unit comprising the instrument packages and a unit comprising the ballast weight and the float module, the unit comprising the instrument packages is directed along a path differing from the path of the free-falling unit comprising the ballast weight, thus ensuring the landing of the instrument packages at a predetermined distance from the ballast weight, and after dropping the ballast weight the instrument packages are lifted off the ocean bottom with the float module attaining a constant ascending speed.

Preferably the submergence path of the unit comprising the instrument packages is formed by way of creating hydrodynamic resistance to the movement thereof in the water mass.

It is desirable, upon landing the unit comprising the ballast weight, to perform hydrodynamic braking of the unit comprising the instrument packages to ensure a soft landing thereof.

These objects are also accomplished in that in a station for deep-water researches, comprising a float module, a ballast weight connected therewith by means of a flexible link, a flexible link release controlled through a hydroacoustic channel, and instrument packages, according to the invention the instrument packages are interconnected by means of a cantilever rod mounted on the float module for a free upward movement, fastened thereto with an elastic rope and provided with a means to create hydrodynamic resistance to the movement of the cantilever rod during the submergence of the station.

The means to create hydrodynamic resistance may be made in the form of a cross-shaped stabilizer arranged on the end of the cantilever rod at an angle thereto, or in the form of a hydrofoil arranged on the end of the cantilever rod also at an angle thereto.

To ensure a soft landing of the instrument packages, the station may be provided with a container with brake parachutes and a mechanism for automatic ejection thereof, the container being hingedly connected to the central part of the cantilever rod.

To facilitate emergence of the station, it is desirable to provide the container with a mechanism for automatic separation of the parachutes the instant the instrument packages are lifted off the ocean bottom.

To provide for an easier ejection of the parachutes, the container may be made in the form of a cone tapering towards a hinge joint, have through ports in the side walls and a removable cover in the base, which cover is controlled by commands of the automatic parachute ejection mechanism.

The method of delivering to the ocean bottom and raising to the surface of a station for deep-water researches effected in accordance with the present invention ensures the solution of two controversial problems, viz., a quick submergence of the station, which contributes to the precise depositing of the instrument packages to the bottom, and a soft landing of the instrument packages and a close contact thereof with the bottom. It becomes possible due to the fact that the station is divided into separate units in the course of submergence. The ballast weight has a substantially high negative buoyancy on which depends the speed of submergence of the station till the moment of the ballast weight landing, whereupon the landing speed of the instrument packages is determined by their own negative buoyancy being less than the negative buoyancy of the ballast weight, as well as by the hydrodynamic resistance in case the brake parachutes are used.

Directing the unit comprising the instrument packages during submergence of the station along a path differing from the path of descent of the unit comprising the ballast weight makes it possible to position the instrument packages on the bottom at a predetermined distance from the ballast weight and precludes the possibility for the instrument packages to fall onto the ballast weight.

The station for deep-water researches according to the present invention is simple in design and reliable in operation.

BRIEF DESCRIPTION OF THE DRAWINGS

The invention will be further described in connection with embodiments thereof, with reference being made to the accompanying drawings, wherein:

FIG. 1 is a general view of a station for deep-water researches prior to submergence;

FIG. 2 is a top view of the station of FIG. 1;

FIG. 8 is a container with brake parachutes;

FIG. 9 is the container of FIG. 8 upon ejection of the parachutes;

DETAILED DESCRIPTION OF THE INVENTION

Figure 3:
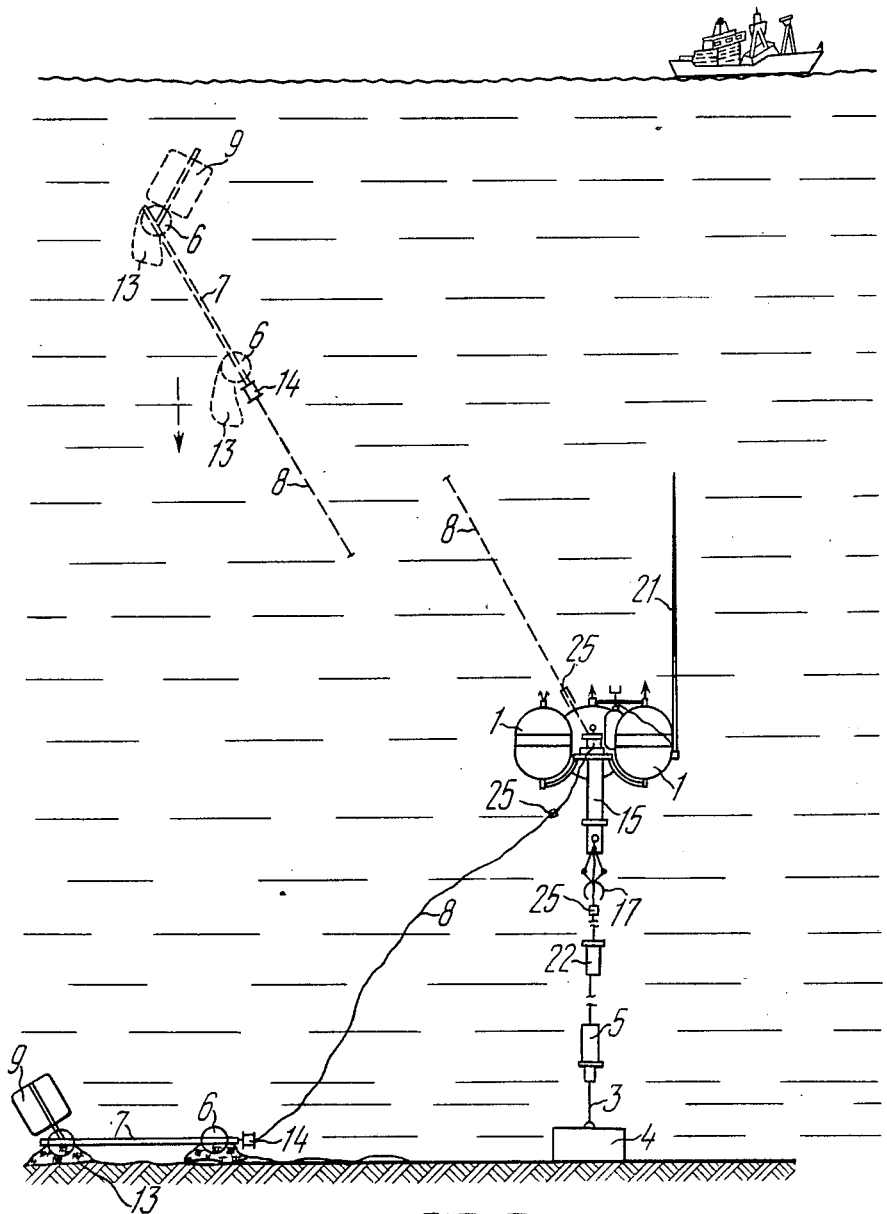
FIG. 3 schematically illustrates the process of delivering the station for deep-water researches of FIG. 1. to the ocean bottom.

The essence of the method of delivering to the ocean bottom and raising to the surface of a station for deep-water researches according to the invention consists in the following.

The station for deep-water researches is launched from a carrier craft and freely falls through the water mass under the action of negative buoyancy of a ballast weight. In the course of free falling, the station is divided into a unit comprising instrument packages and a unit comprising the ballast weight and a float module. The unit comprising the instrument packages is directed along a path differing from the path of the free-falling unit comprising the ballast weight, thus ensuring landing of the instrument packages and the ballast weight to the bottom at a predetermined distance from each other. The exploration work completed, the ballast weight is dropped and the station freely emerges to the surface under the action of positive buoyancy of the float module. The instrument packages are separated from the ocean bottom with the float module attaining a constant ascending speed.

To ensure a softer landing of the instrument packages with a substantially high speed of their submergence in the water mass, after the unit comprising the ballast weight has landed to the bottom, the unit comprising the instrument packages is hydrodynamically braked.

The path of submergence of the unit comprising the instrument packages is formed by way of creating hydrodynamic resistance to the movement thereof in the water mass.

An example of practising the method of the invention is described below. It resides in free submergence of the station in the water mass at a speed of 1.4 to 1.8 m/s with dividing the station into two units, the own speed of free submergence of the unit comprising the instrument packages, equalling 0.15 to 0.20 m/s, is realized at the moment the unit separates from the station and drifts away, due to nonuniforming of the flow around it, from the path of submergence of the unit comprising the ballast weight and also during a soft landing of the instrument packages at a distance of 20 to 30 m from the ballast weight on the ocean bottom. It should be noted that in the process of free submergence of the station the submergence speed of the separated unit comprising the instrument packages is accelerated up to a value of a mean resultant speed of the free-falling station. The ballast weight consistently goes ahead (its free submergence speed being equal to 5 m/s) until the distance separating it from the unit comprising the instrument packages reaches 10 to 15 m, which equals the length of a rope connecting the separated units, whereupon it is decelerated to the mean speed of the free-falling station. After the station has fulfilled the program of bottom researches, the float module released from the ballast weight accelerates in the course of free emergence up to a constant ascending speed of about 1.5 m/s and having a mass exceeding by an order the mass of the instrument packages, performs with a jerk a guaranteed lift off of the instrument packages from the ocean bottom, ensuring a further free surfacing of the station, detection and retrieving thereof by the carrier craft.

Thus, the invention provides for an increased reliability in operation of the deep-water recording instruments by way of softly landing the instrument packages at a predetermined distance from the ballast weight without diminishing a substantially high speed of submergence of the station as a whole, as well as by way of a faultless emergence of the station due to a guaranteed lift off of the instrument packages from the ocean bottom after the recording instruments have completed their work.

Figure 5:
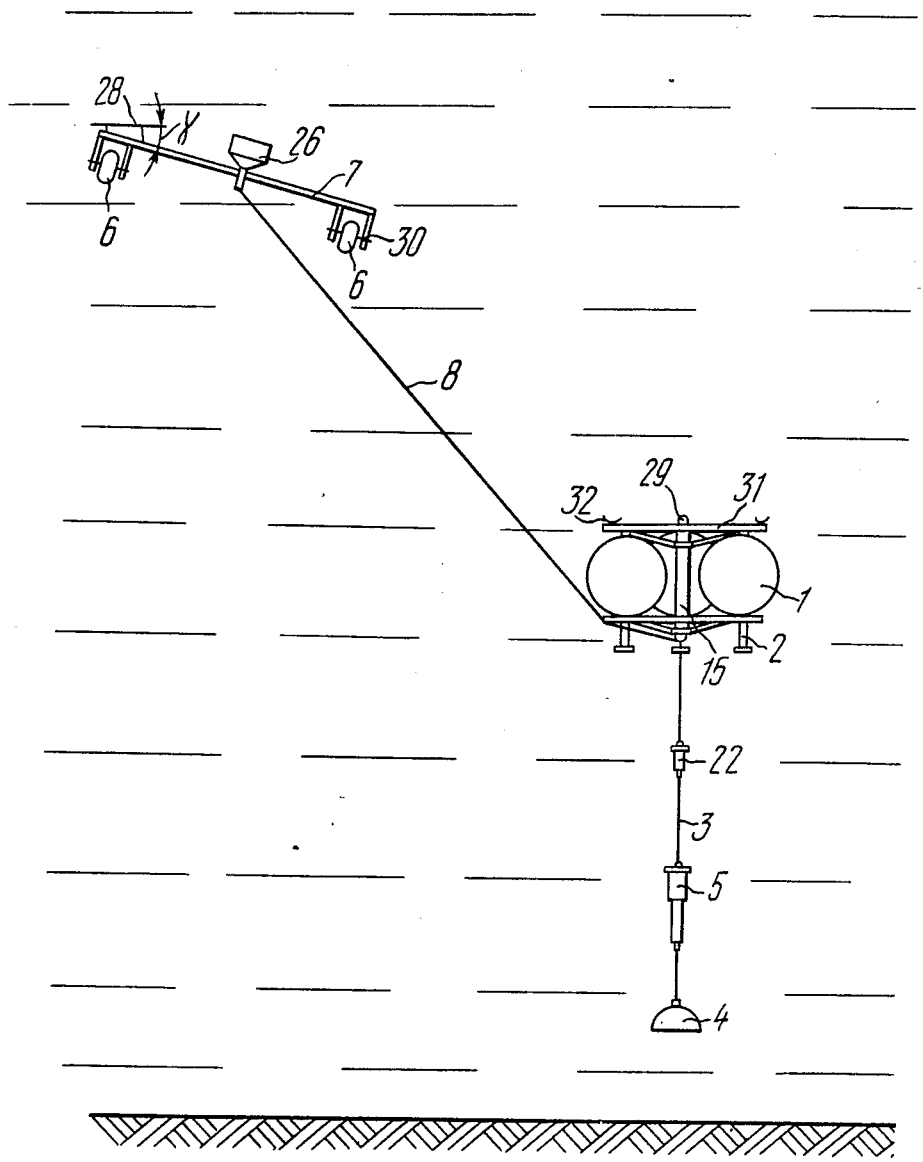
FIG. 5 is an embodiment of the station for deep-water researches with brake parachutes in the process of free submergence in the water mass.
Figure 6:
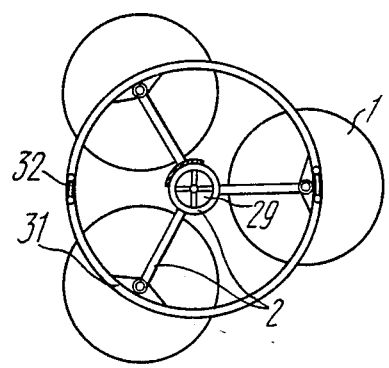
FIG. 6 is a top view of a float module of the station of FIG. 5.

The method according to the invention will be more fully understood from the following description of the work of the deep-water research station embodiments illustrated in FIGS. 1, 2, 5.

The station for deep-water researches, shown in FIGS. 1 and 2, comprises a float module 1 made up of three composite floats interconnected by a framework 2. The float module 1 is connected by means of a flexible rope link 3 with a ballast weight 4. The station also comprises a release 5 of the rope 3, controlled through a hydroacoustic channel, and two instrument packages 6 interconnected by means of a hollow cantilever rod 7 accommodating electric cables (not shown) in the interior space thereof. The rod 7 is mounted on the float module 1 for a free upward movement (FIG. 1) and connected therewith by an elastic rope 8. The cantilever rod 7 has a means to create hydrodynamic resistance to the movement of the rod 7 with the instrument packages 6 in the course of free submergence of the station in the water mass. Said means is made in the form of a cross-shaped stabilizer 9 arranged on an end of the cantilever rod 7 at an angle $\alpha$ thereto. The angle $\alpha$ is chosen to be within a range $0<\alpha<90°$ depending on a desirable path of submergence of the rod 7 with the instrument packages 6. The cantilever rod 7 arranged on the float module 1 rests on a V-shaped storm grip 10 and a crossbar 11 interconnecting two other storm grips 12. Each instrument package 6 is provided with a contact pad 13 made of an elastic material and filled with quartz sand. The free end of the cantilever rod 7, opposite to the end accommodating the cross-shaped stabilizer 9, mounts a freely rotating drum 14 intended to receive the elastic rope 8. Mounted between individual floats of the module 1 on the framework 2 is a central rod 15 the upper end of which is provided with a hoisting ring 16 and the lower end mounts a locking device 17 adapted to interact with a shackle 18 fastened to the ballast weight 4. In addition the station is provided with a system assisting in searching and locating thereof in the ocean which in the embodiment described herein comprises a radio beacon 19 connected through a cable 20 with an antenna 21 and a sonar beacon 22. The framework 2 has a guide flange 23 to receive the central rod 15 and move along the latter. The guide flange 23 is loaded with a spring 24. The connecting ropes 3 and 8 are provided with swivels 25 to preclude their twisting.

Another embodiment of the station for deep-water researches, which ensures a soft landing of the instrument packages 6 at a high speed of submergence of the station, is illustrated in FIGS. 5, 6, 7, 8, 9, 10, 11 and 12. This embodiment differs from the embodiment of the station shown in FIGS. 1 and 2 in that it comprises a container 26 (FIG. 5) with brake parachutes 27 (FIG. 7) canopies of which are made from an elastic polymeric material and have central stabilizing vents. Used as a means to create hydrodynamic resistance to the movement of the cantilever rod 7 (FIGS. 5, 6) in the embodiment in question is a hydrofoil 28 also arranged on an end of the rod 7 at an angle $\gamma$ thereto.

The central rod 15 is made integral with the body of a flashing beacon 29 incorporated in the system assisting in searching and locating the station in the ocean. The instrument packages 6 are suspended from the cantilever rod 7 with the use of hinges 30 which provide for turning the instrument packages 6 on the ocean bottom to occupy a position of the maximum contact with the surface of the bottom. The framework 2 is additionally provided with carrier stopper rings 31, the upper one having shaped lugs 32 to receive the cantilever rod 7 with the instrument packages 6. The container 26 with the brake parachutes 27 is hingedly connected to the centre of the cantilever rod 7 so as to be able to turn around it and has in the lower part thereof a locking plate 33 operatively associated with a compression spring 34.

Figure 10:
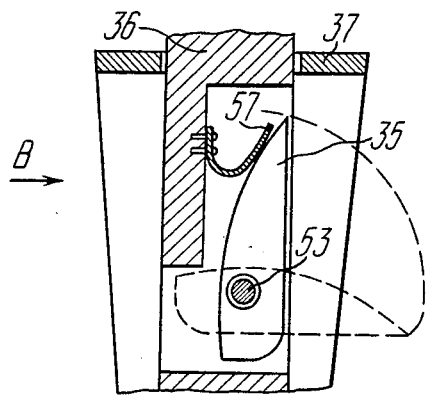
FIG. 10 is a detail A of FIG. 9, on an enlarged scale.
Figure 11:
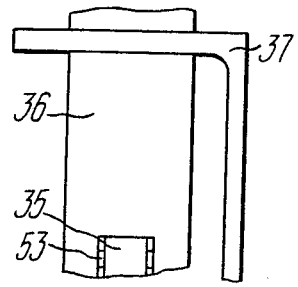
FIG. 11 is a view along the arrow B of FIG. 10.
Figure 7:
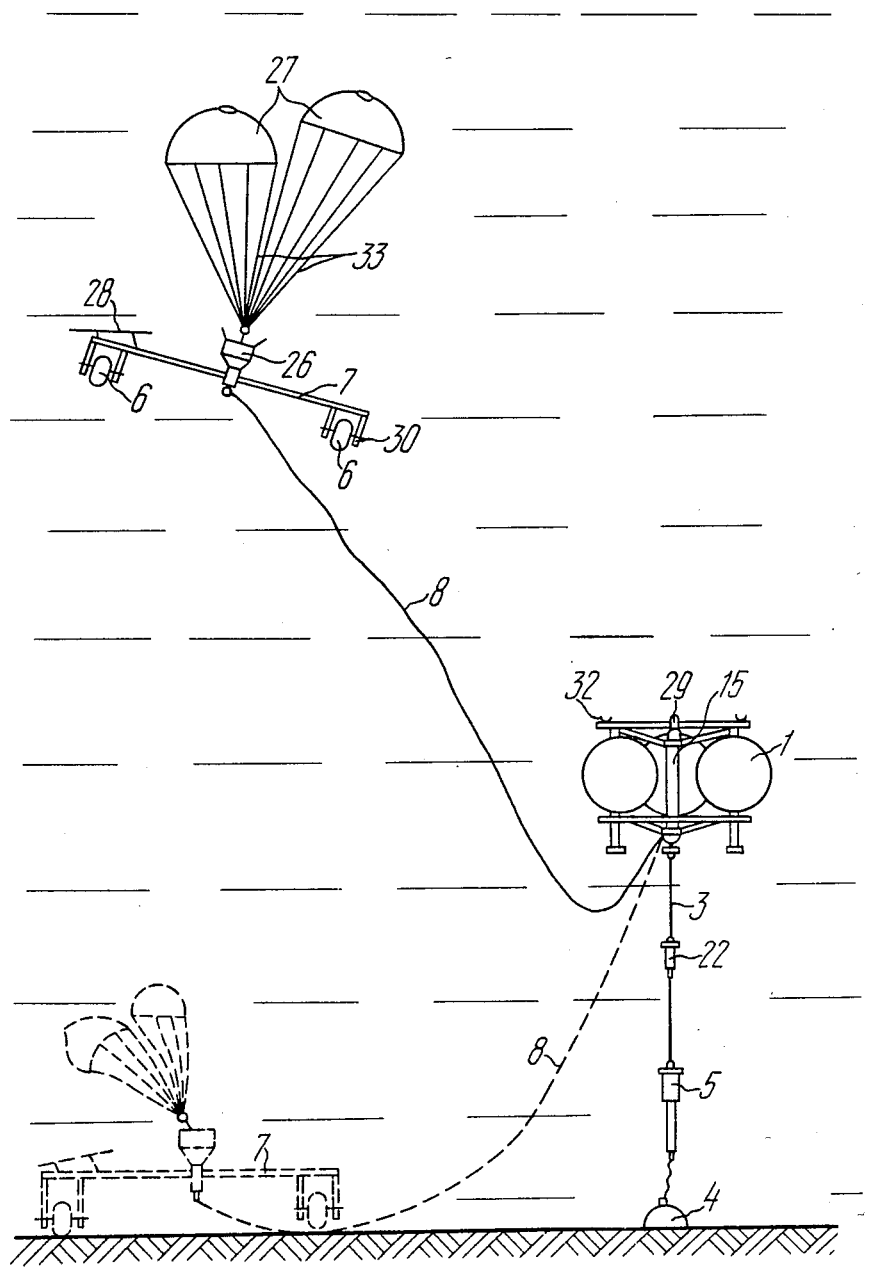
FIG. 7 is the station of FIG. 5 at the moment of landing of the instrument packages.
Figure 12:
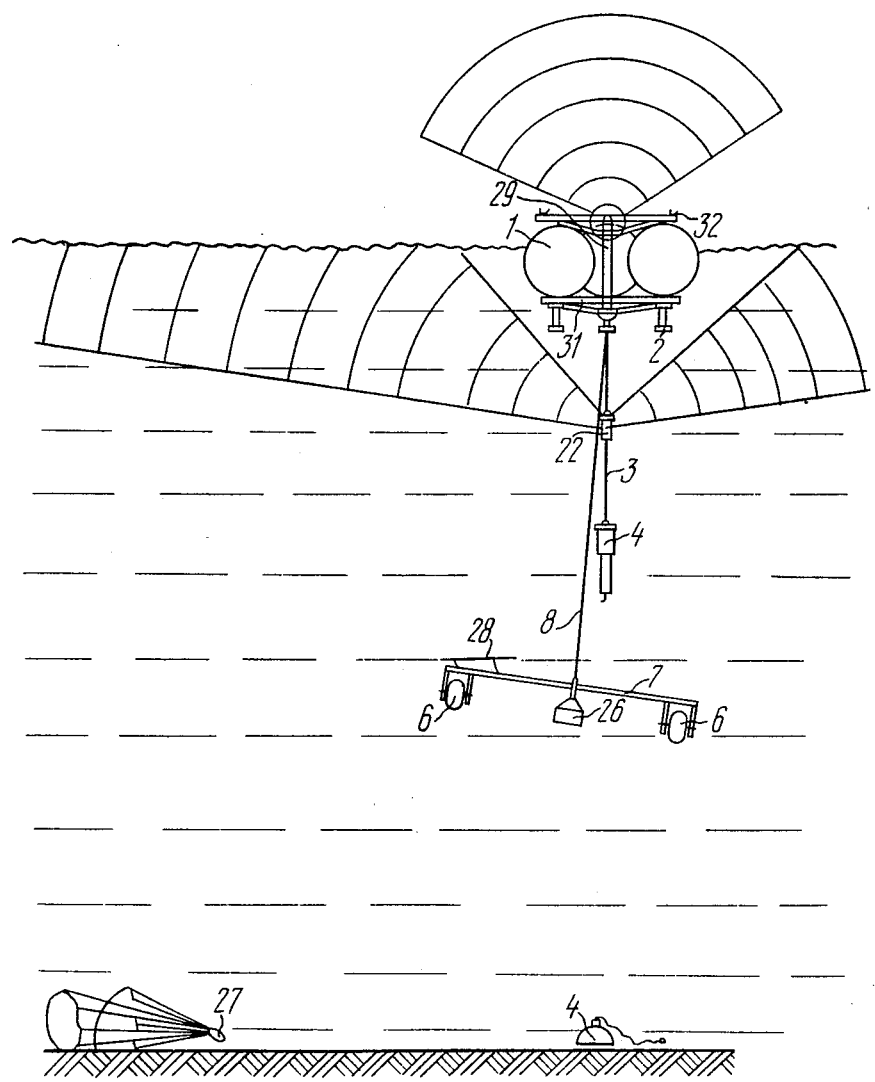
FIG. 12 is the station of FIG. 5 in the process of emerging to the surface after dropping the brake parachutes.

A gib 35 is secured in a rod 36 mounted so as to interact with an L-type latch 37. A lock 38 is mounted for interaction with a retaining spring 39. The container 26 also has a link 40 combined with an L-type lever 41 and coupled with a movable ring 42. The retaining spring 39 can interact with a shaped guide 43. The movable ring 42 is provided with a piston 44 having a through hole (not shown). The piston 44 is connected with a sliding bush 45 which passes the cantilever rod 7 with the instrument packages. The lock 38 is positioned in a cylindrical spring 46. Hinged flaps 47, a retaining ring 48 attached whereto are parachute shroud lines 49, a central tube 50 connected with the sliding bush 45 are all the component parts of the container 26. The movable ring 42, the compression spring 34 and the link 40 are connected to a container body 52 with the help of a centering nut 51. The gib 35 is fixed on an axle 53 (FIGS. 10, 11) in the body of the rod 36 (FIGS. 8, 9) retained in a preset position by a shaped spring 54. Halves of a removable cover 55 are hingedly connected with the body 52, which has a bearing partition 56. The gib 35 is loaded with a blade spring 57 (FIG. 10). The movable ring 42 (FIGS. 8, 9) has spaces I and II separated by the piston 44 having a through hole. The body 52 has through ports 58. The retaining spring 39 has a lug 59 adapted to slide over the shaped guide 43. The body of the container 26 is made in the form of a cone tapering towards a hinge joining it with the rod 7.

The station for deep-water researches shown in FIGS. 1 and 2 is delivered to the ocean bottom and raised to the surface in the following way.

Prior to launching the station from the carrier craft, the hydroacoustic release 5 of the rope and the sonar beacon 22 with the rope 3 are placed in chutes (not shown) on the ballast weight 4. The rope 8 is reeled up on the freely rotating drum 14, whereupon the cantilever rod 7 with the instrument packages 6 is positioned on the grips 10 and 12 of the float module 1.

The station fully equipped and prepared for operation on the carrier craft deck is lowered therefrom so as to be below the water level, then it is released from the pelican hook of the hoisting facility (not shown) to become self-contained and starts free submergence in the water mass under the action of negative buoyancy created by the ballast weight 4. On being released from the pelican hook the central rod 15 acted upon by the ballast weight 4 moves down and disconnects the hinge gripper of the locking device 17 from the shackle 18 of the ballast weight 4, which results in a quicker submergence of the ballast weight 4 and consequently in unreeling the rope 3. Unreeling the rope 3 provides for the separation of the rope hydroacoustic release 5 and the sonar beacon 22 and their spaced positioning over the length of the rope 3. The spring 24 provides for a smooth braking of the ballast weight 4 after the rope 3 has been completely unreeled. The hydrodynamic resistance forces arising during movement of the free-falling station through the water mass remove the cantilever rod 7 with the instrument packages 6 from the grips 10 and 12 and the cantilever rod 7 due to the action of an incoming flow on the stabilizer 9 starts drifting away from the path of submergence of the separated unit with the ballast weight 4 and module 1. The rope 8 unreels through its free length from the drum 14. As the speed of free submergence of the cantilever rod 7 with the instrument packages 6, equal to 0.2-0.15 m/s, is lower than the speed of free submergence of the ballast weight 4 (1.4 to 1.8 m/s) stretching of the rope 8 is ensured. Possible twisting of the rope 8, as well as of the rope 3, is precluded by means of the swivels 25. With the ballast weight 4 (FIG. 3) reaching the ocean bottom, braking of the station starts; the float module 1 stretches the rope 3 with the sonar beacon 22 and the hydroacoustic release 5 of the rope spaced apart over the length thereof. The cantilever rod 7 with the instrument packages 6 continues free submergence to make a comparatively soft contact with the ocean bottom. As soon as the cantilever rod 7 with the instrument packages 6 and contact pads 13 implants on the ocean bottom at a distance of 20 to 30 m from the ballast weight 4, depositing of the deep-water station is considered to be completed.

Figure 4:
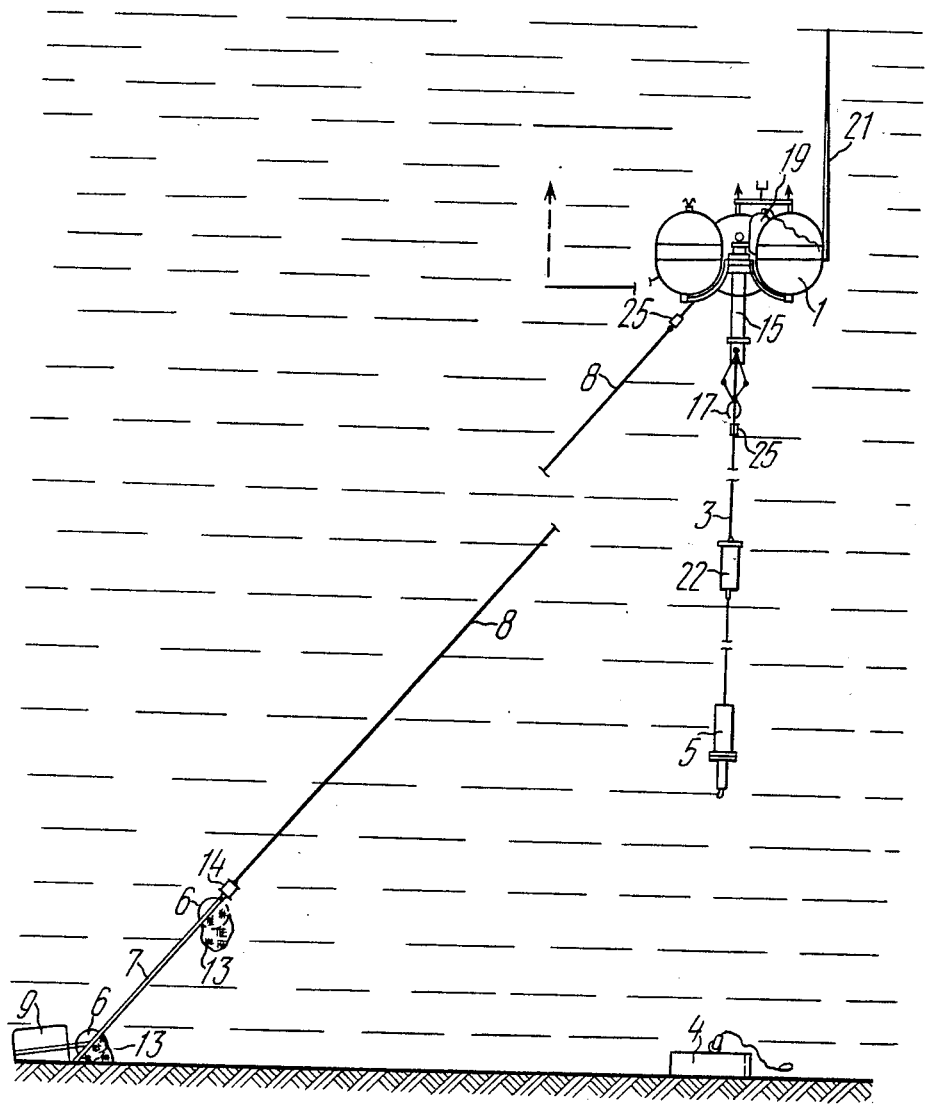
FIG. 4 schematically illustrates the process of recovering the station of FIG. 1 from the ocean bottom.

After the station has fulfilled the program involving measurements, data recording and taking samples, the carrier craft starts searching the station on the ocean bottom using a ship-borne sonar (not shown) and the sonar beacon 22 (FIG. 4). Upon detecting the station on the ocean bottom, a command is supplied through the hydroacoustic channel for operation of the hydroacoustic release 5 of the rope which severs the rope 3 just between the ballast weight 4 and the hydroacoustic release 5 of the rope 3. The float module 1 being freed from the ballast weight 4 starts emerging in the water mass under the action of positive buoyancy accelerating up to a steady speed of the order of 1.5 m/s. After taking up the slack of the rope 8 there is occurred a jerk with an impulse of force corresponding to the known relation between the mass of the station and the ascending speed thereof. The jerk force is sufficient to separate in succession the instrument packages 6 with the contact pads 13 from the ocean bottom. After the instrument packages 6 have been lifted off the ocean bottom the emergence of the station continues until it breaks surface to be detected with the help of the system of searching and locating, e.g. a radio direction finder (not shown) and the radio beacon 19 and then to be recovered at a slow speed of the carrier craft with the use of a special net sweep (not shown) and the storm grips 12 (FIGS. 1, 2).

The embodiment of the station represented in FIGS. 5 to 12 is delivered to the ocean bottom and raised to the surface in the manner similar to that described above with the only difference that after the unit comprising the ballast weight 4 has landed to the ocean bottom the hydrodynamic braking of the unit comprising the instrument packages 6 is performed and a softer landing thereof is thus ensured. In this case the station on being launched from the carrier craft (not shown) freely submerges in the water mass. An incoming flow acting on the hydrofoil 28 (FIG. 5) causes the cantilever rod 7 with the instrument packages 6 to drift away from the path of submergence of the unit comprising the ballast weight 4. The distance of the drift of the cantilever rod 7 is limited by the rope 8. Upon landing the ballast weight 4 (FIG. 7) the rope 8 becomes loose and the mechanism for automatic ejection of the parachutes 27 operates. For this, the mechanism should be preliminarily aboard ship made ready for operation as described below. The movable ring 42 (FIG. 8) is pulled down in the centering nut 51 as far as it will go, the hinged flaps 47 are opened (shown by a dashed line), the gib 35 is depressed flush with the rod 36 and the locking plate 33 is inserted into the groove of the movable ring 42. The lock 38 with the cylindrical spring 46 is slightly depressed to be thrown in engagement with the retaining spring 39 rigidly connected with the L-type lever 41 and the movable ring 42. The spring 34 is compressed and the L-type latch 37 goes out of engagement with the gib 35, thereby the rod 36 is loaded with the shaped spring 54.

In the course of free submergence of the station in the water mass the movable ring 42 is acted upon by a force transmitted by the rope 8, which compresses the spring 34 and the locking plate 33 falls out of the groove owing to an oblique cut in the body of the movable ring 42. All changes in the load acting on the rope 8 are taken up by the movable ring 42 and the compression spring 34, and, consequently, by the piston 44 which has a through hole communicating the spaces I and II. The movable ring 42 makes upward and downward motions with respect to the piston 44, which likewise the central tube 50 is rigidly secured on the sliding bush 45 (FIG. 9), under the action of the compression spring 34 influenced by the changing load on the rope 8. The water flows from the space I into the space II or vice versa. With the rope 8 (FIG. 7) being slackened the instant the ballast weight 4 touches down the bottom, the movable ring 42 (FIG. 9) is forced by the compression spring 34 to return to the initial position. As a result, the retaining spring 39 goes out of engagement with the lock 38 sliding upward over the shaped lug 59 disposed on the retaining spring 39 and interacting with the shaped guide 43. The halves of the cover 55 under the pressure of flow incoming through the ports 58 disposed along the perimeter of the body 52 and the holes in the bearing partition 56 will open and the incoming flow will eject the parachutes 27 from inside the body 52 of the container 26. Simultaneously with returning of the movable ring 42 to the upper position the L-type latch 37 passes by the gib 35 turning around the axle 53 (FIGS. 10, 11), compresses the blade spring 57 and stops. It should be noted that due to attachment of the instrument packages 6 (FIG. 7) on the cantilever rod 7 by means of the hinges 30 and due to hinged connection of the container 26 to the cantilever rod 7 the instrument packages 6 are tightly implanted on the ocean bottom automatically occupying the optimum position.

The program of the deep-water researches completed, a command for surfacing is supplied from the carrier craft to the hydroacoustic release 5, after which the float module 1 is separated from the ballast weight 4, starts to ascend carrying along the cantilever rod 7 with the instrument packages 6 after lifting them off the ocean bottom. The rope 8 is again stretched tight actuating the mechanism of automatic separation of the parachutes. The stretched rope 8 compresses the spring 34 (FIG. 9) and pulls down the L-type latch 37 rigidly connected with the link 40 combined with the L-type lever 41 and the movable ring 42. The L-type latch 37 carries along the rod 36 since the gib 35 is in the thrown-away position and does not interfere with its displacement. As a result, the shaped spring 54 is forced out and the retaining ring 48 (FIG. 8) drops out permitting separation of the parachutes 27 (FIG. 12) from the container 26. Thus, the station emerges at an increased speed since the brake parachutes 27 is not a handicap. The stopper rings 31 prevent the rope 8 from being entangled, which also contributes to a better reliability in the independent operation of the station in the course of submergence and emergence thereof.

The surfaced station is located with the help of the flashing beacon 29 and the sonar beacon 22, caught and taken aboard.

What is claimed is:
1. A station for deep-water research comprising
   a float module;
   a ballast weight;
   a flexible link connecting said float module with said ballast weight;
   a release for said flexible link;
   a hydroacoustic channel to control said release;
   at least one instrument package;
   a cantilever rod on which said instrument package is secured, said cantilever rod being freely mounted on said float module for free movement away therefrom during submergence and upon application of hydrodynamic resistance to the movement of said rod;
   an elastic rope connecting said cantilever rod with said float module; and
   means disposed on said rod for creating a directed hydrodynamic resistance to the movement of said cantilever rod during submergence in a water mass,
   said means providing the hydrodynamic resistance to be directed to cause separation and movement away from the path of said float module, and
   wherein said means to create hydrodynamic resistance is disposed in the form of a cross-shaped stabilizer arranged on an end of said cantilever rod at an angle thereto.
2. A station for deep-water research comprising
   a float module;
   a ballast weight;
   a flexible link connecting said float module with said ballast weight;
   a release for said flexible link;
   a hydroacoustic channel to control said release;
   at least one instrument package;
   a cantilever rod on which said instrument package is secured, said cantilever rod being freely mounted on said float module for free movement away therefrom during submergence and upon application of hydrodynamic resistance to the movement of said rod;
   an elastic rope connecting said cantilever rod with said float module; and
   means disposed on said rod for creating a directed hydrodynamic resistance to the movement of said cantilever rod during submergence in a water mass,
   said means for providing the hydrodynamic resistance to be directed to cause separation and movement away from the path of said float module, and
   wherein said means to create hydrodynamic resistance is disposed in the form of a hydrofoil arranged on an end of said cantilever rod at an angle thereto.
3. A station for deep-water research comprising
   a float module;
   a ballast weight;
   a flexible link connecting said float module with said ballast weight;
   a release for said flexible link;
   a hydroacoustic channel to control said release;
   at least one instrument package;
   a cantilever rod on which said instrument package is secured, said cantilever rod being freely mounted on said float module for free movement away therefrom during submergence and upon application of hydrodynamic resistance to the movement of said rod;
   an elastic rope connecting said cantilever rod with said float module; and
   means disposed on said rod for creating a directed hydrodynamic resistance to the movement of said cantilever rod during submergence in a water mass,
   said means providing the hydrodynamic resistance to be directed to cause separation and movement away from the path of said float module, and
   additionally comprising means for hydrodynamically braking said cantilever rod, which comprises
   a container;

a hinge connecting said container to a central part of said cantilever rod;

at least one brake parachute accommodated in said container; and means for automatic ejection of said parachute accommodated in said container, said container, shaped as a cone tapering towards said hinge joint, being provided with through-ports in side walls thereof, and comprising a removable cover on a base thereof, which is controlled by said means for automatic ejection of said parachute.

4. A station for deep-water research as claimed in claim 3, wherein said container comprises means for automatic separation of said parachute from said container, when said instrument package is lifted off the water mass bottom.

* * * * *